United States Patent
Do et al.

(10) Patent No.: US 11,722,023 B2
(45) Date of Patent: Aug. 8, 2023

(54) STRUCTURE FOR FIXING PERMANENT MAGNET IN ROTOR CORE

(71) Applicants: HYUNDAI MOTOR COMPANY, Seoul (KR); KIA MOTORS CORPORATION, Seoul (KR)

(72) Inventors: Sang Hwa Do, Seongnam-si (KR); Nyeon Han Hong, Gwangmyeong-si (KR); Kyoung Bum Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 207 days.

(21) Appl. No.: 17/091,175

(22) Filed: Nov. 6, 2020

(65) Prior Publication Data
US 2021/0351644 A1  Nov. 11, 2021

(30) Foreign Application Priority Data
May 7, 2020  (KR) .................. 10-2020-0054185

(51) Int. Cl.
*H02K 1/27* (2022.01)
*H02K 1/276* (2022.01)
*H02K 15/03* (2006.01)

(52) U.S. Cl.
CPC ............ *H02K 1/276* (2013.01); *H02K 15/03* (2013.01); *H02K 2201/09* (2013.01)

(58) Field of Classification Search
CPC .... H02K 1/276; H02K 15/03; H02K 2201/09; H02K 1/28; H02K 1/27
See application file for complete search history.

(56) References Cited

U.S. PATENT DOCUMENTS

| 2013/0026872 A1* | 1/2013 | Cirani ................. H02K 1/2766 |
|---|---|---|
| | | 310/156.08 |
| 2015/0137650 A1* | 5/2015 | Takahashi ............... H02K 1/32 |
| | | 310/156.56 |

FOREIGN PATENT DOCUMENTS

WO    WO-2005043741 A2 *  5/2005  ............. H02K 1/276

* cited by examiner

*Primary Examiner* — Thomas Truong
(74) *Attorney, Agent, or Firm* — Lempia Summerfield Katz LLC

(57) ABSTRACT

A structure for fixing a permanent magnet in a rotor core. The structure includes a magnet accommodation portion into which a permanent magnet is to be inserted, an internal hole formed in an area adjacent to one end of the magnet accommodation portion, a pressing portion provided between the magnet accommodation portion and the internal hole. The pressing portion forms a convex shape toward the permanent magnet to be in contact with the permanent magnet.

8 Claims, 4 Drawing Sheets

FIG. 1 "PRIOR ART"
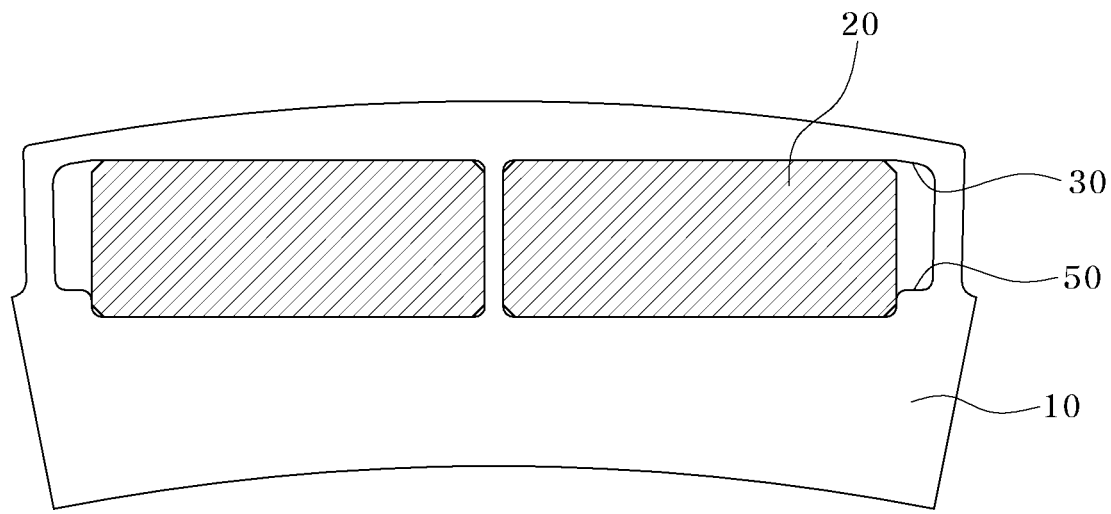
FIG. 2
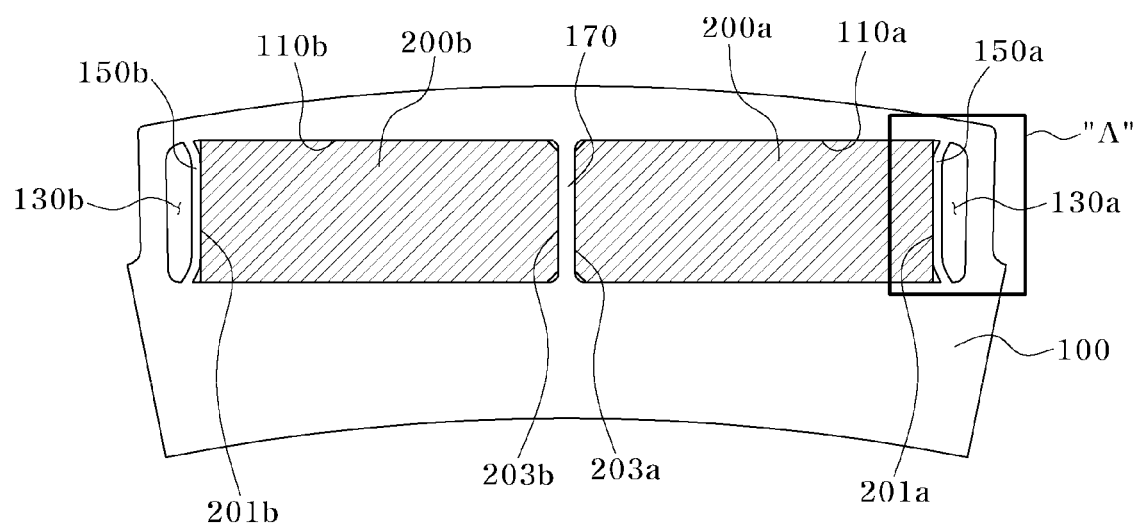

STRUCTURE FOR FIXING PERMANENT MAGNET IN ROTOR CORE

CROSS REFERENCE TO RELATED APPLICATION

This application claims priority to and the benefit of Korean Patent Application No. 10-2020-0054185, filed on May 7, 2020, the entire contents of which are incorporated herein by reference.

FIELD

The present disclosure relates to a structure for and a method of fixing a permanent magnet in a rotor core.

BACKGROUND

The statements in this section merely provide background information related to the present disclosure and may not constitute prior art.

In accordance with a growing trend toward high power and high efficiency of a drive motor for an eco-friendly vehicle, interior permanent magnet (IPM) motors have been widely used. Generally, a rotor includes a rare-earth magnet provided in a rotor core. The rotor core has magnet accommodation holes to accommodate respective permanent magnets. A chamfering process of rounding off the edges of a permanent magnet is required to easily insert the permanent magnet into the magnet accommodation hole. Because of the characteristics of the punching process, the magnet accommodation portion defined in the rotor core has rounded edges instead of right-angled edges. Therefore, without the chamfering process, it is difficult to insert the permanent magnet into the magnet accommodation portion. Even if inserted, the permanent magnet can be damaged. In addition, when the permanent magnet is received in the magnet accommodation portion of the rotor core, an airgap remains between the surface of the magnet accommodation portion and the surface of the permanent magnet. Therefore, for secure fixation of the permanent magnet in the magnet accommodation portion in the rotor core, the airgap needs to be filled with epoxy resin.

With reference to FIG. 1, the chamfering process of rounding off right-angled edges is performed in order to easily insert a permanent magnet 20 into a magnet accommodation portion 30 in a rotor core 10. Since the edges of the permanent magnet 20 are rounded through the chamfering process, the permanent magnet 20 can be easily inserted into the magnet accommodation portion 30. However, after the permanent magnet 20 is inserted into the magnet accommodation portion 30, a process of filing the remaining space in the magnet accommodation portion 30 with epoxy resin needs to be performed, and a fixation jaw 50 is also desired to firmly fix the permanent magnet 20. However, we have discovered that the chamfering process increases the manufacturing cost and lowers the efficiency of the motor. In addition, when the size of the magnet accommodation portion 15 is increased for easy insertion of the permanent magnet 20 and to remove this undesirable chamfering process for the permanent magnet 20, an excessive airgap is formed between the surface of the magnet accommodation portion and the permanent magnet 20 in a state in which the permanent magnet is received in the magnet accommodation portion, thereby lowering the performance of the drive motor.

SUMMARY

The present disclosure provides a structure for fixing a permanent magnet using a pressing portion. With this structure, neither a fixation jaw for fixing a permanent magnet nor epoxy resin to fill an airgap between the surface of a permanent magnet and the surface of a magnet accommodation portion is required.

Another objective of the present disclosure is to provide a method of fixing a permanent magnet in a rotor core. With this method, a chamfering process of rounding off edges of a permanent magnet can be omitted.

According to an aspect of the present disclosure, there is provided a structure for fixing a permanent magnet in a rotor core. The structure includes: a magnet accommodation portion into which a permanent magnet is to be inserted; an internal hole defined in an area adjacent to one end of the magnet accommodation portion; and a pressing portion provided between the magnet accommodation portion and the internal hole. In particular, the pressing portion forms a convex shape toward the permanent magnet and is in contact with the permanent magnet.

In the structure, in the permanent magnet, the one end of the permanent magnet to come into contact with the pressing portion may have right-angled edges.

In the structure, the pressing portion may include a contact portion that comes into contact with the one end of the permanent magnet and a non-contact portion that does not come into contact with the one end of the permanent magnet. The non-contact portion may be an area that is closer to the edge of the permanent magnet than the contact portion.

In the structure, the rotor core may include a pair of permanent magnets that is inserted in the magnet accommodation portion.

In the structure, one end of each of the permanent magnets and the other end of each of the permanent magnets may have right-angled edges, the one end of the respective permanent magnets coming into contact with the respective pressing portions, and the other end of the respective permanent magnets coming into contact with each other.

In the structure, epoxy resin may not be provided between the permanent magnet and the pressing portion.

In structure, two magnet accommodation portions may be provided in the rotor core, a partition that is a portion of the rotor core may be disposed between the two magnet accommodation portions, and permanent magnets constituting a pair may be inserted in the two magnet accommodation portions, respectively.

In the structure, the other end of each of the permanent magnets in a pair may have rounded edges resulting from performing a chamfering process, the other end coming into contact with the partition, and the one end of each of the permanent magnets may have right-angled edges, the one end of the permanent magnets coming into contact with the pressing portions, respectively.

According to another aspect of the present disclosure, there is provided a method of fixing a permanent magnet in a rotor core. The method includes: forming a magnet accommodation portion into which a permanent magnet is to be inserted, and an internal hole defined in an area adjacent to one end of the magnet accommodation portion; inserting the permanent magnet into the magnet accommodation portion; performing a caulking process by inserting a bar into the internal hole; and pressing a pressing portion, provided between the internal hole and the magnet accommodation portion, toward the permanent magnet, using the bar.

In the method, because the pressing portion is pressed toward the permanent magnet, a chamfering process of rounding off edges of the one end of the permanent magnet may be omitted, the pressing portion coming into contact with the one end of the permanent magnet.

In the method, because the pressing portion is pressed toward the permanent magnet, a process of providing epoxy resin into the magnet accommodation portion into which the permanent magnet is inserted may be omitted.

In the method, the pressing portion may be convex toward the permanent magnet, and the pressing portion may include a contact area that comes into contact with the one end of the permanent magnet and a non-contact area that does not come into contact with the one end of the permanent magnet.

According to one form of the present disclosure, a chamfering process of rounding off edges of a pair of permanent magnets can be omitted with pressing portions that fix the permanent magnets without coming into contact with edges of the oneone end of the respective permanent magnets. Thus, the cost of performing the chamfering process can be reduced.

According to another form of the present disclosure, there is no need to provide fixation jaws for fixing a pair of permanent magnets and to form a large-sized magnet accommodation portion in order to prevent damage to the pair of permanent magnets. Thus, magnetic flux leakage can be prevented from occurring due to the fixation jaws and empty spaces in the rotor core. In addition, the chamfering process of rounding off the edges of the permanent magnets is not performed. Thus, magnetic flux of the pair of the permanent magnets increases by approximately 0.1 kg, thereby improving motor performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating a general form of a rotor core;

FIG. 2 is a view illustrating a rotor core structure for fixing a permanent magnet according to one form of the present disclosure;

Figure 3:
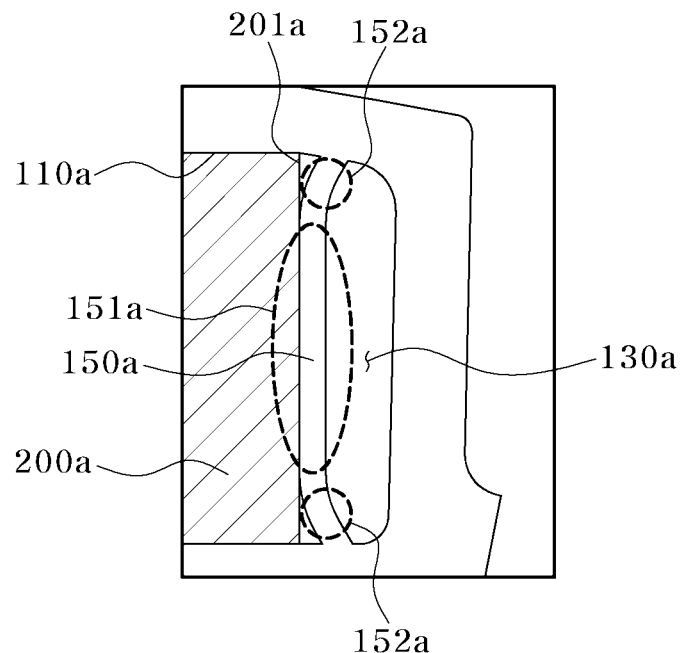
FIG. 3 is an enlarged view illustrating an area A in FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Advantages and features of the present disclosure and methods of achieving the advantages and the features will be apparent from the accompanying drawings and from forms that will be described in detail below. However, the present disclosure is not limited to the forms that will be disclosed below, and various different forms thereof may be realized. The forms are provided to provide an adequate notice to a person of ordinary skill in the art to which the present disclosure pertains as to the scope of the disclosure.

The term "unit", "module", or the like, which is used throughout the specification, means an individual component that performs at least one function or operation and may be realized in hardware, software, or a combination of both.

In addition, in order to distinguish among constituent elements that have the same name, the terms first, second, and so on are used throughout the present specification. In the following description, no limitation to the order of the terms is necessarily imposed.

The present disclosure is described in detail in an illustrative manner. In addition, the above contents are provided for exemplary forms of the present disclosure, and apply to various different combinations of, and various different modifications to, the forms under various environments. Modifications or alterations to the disclosure are possible within the scope of the concept of the disclosure disclosed in the present specification, the scope of equivalents of the described contents of the disclosure, and/or the scope of technology or knowledge in the art. Various modifications to the forms, which are desired in the field in which the present disclosure finds application and that are desired to use the present disclosure, are possible as well. Therefore, in the detailed description of the present disclosure, the forms as disclosed are not intended to impose any limitation to the present disclosure. In addition, the following claims should be construed to cover other forms as well.

FIG. 2 is a view illustrating a rotor core structure for fixing a permanent magnet according to one form of the present disclosure.

With reference to FIG. 2, magnet accommodation portions 110a and 110b and internal holes 130a and 130b are defined in the rotor core 100. Permanent magnets 200a and 200b are inserted into the magnet accommodation portions 110a and 110b, respectively. Each of the internal holes 130a and 130b is adjacent to one end of a corresponding one of the magnet accommodation portions 200a and 200b.

The permanent magnets 200a and 200b constituting a pair are provided in the rotor core 100. Accordingly, there are provided as many magnet accommodation portions 110a and 110b and internal holes 130a and 130b as there are permanent magnets 200a and 200b. Specifically, the first magnet accommodation portion 110a and the second magnet accommodation portion 110b are defined in the rotor core 100. The first permanent magnet 200a is inserted into the first magnet accommodation portion 110a, and the second permanent magnet 200b is inserted into the second magnet accommodation portion 110b. The first internal hole 130a is defined in an area adjacent to one end of the first magnet accommodation portion 110a. The second internal hole 130b is defined in an area adjacent to one end of the second magnet accommodation portion 110b.

A pressing portion 150a (i.e., a portion of the rotor core 100) is defined between the magnet accommodation portion 110a and the internal hole 130a. A pressing portion 150b (i.e., a portion of the rotor core 100) is defined between the magnet accommodation portion 110b and the internal hole 130b. There are provided as many pressing portions 150a and 150b as there are permanent magnets 200a and 200b.

That is, the pressing portions 150a and 150b serve to separate the magnet accommodation portions 110a and the internal hole 130a and the magnet accommodation portions 110b and the internal hole 130b, respectively. A partition 170 (i.e., a portion of the rotor core 100) is defined between the pair of the permanent magnets 200a and 200b.

The pressing portions 150a and 150b have their respective forms that are convex toward the pair of the permanent magnets 200a and 200b. The pressing portions 150a and 150b, respectively, apply pressure to the pair of the permanent magnets 200a and 200b, and thus, respectively, fix the permanent magnets 200a and 200b. Respective portions of the pressing portions 150a and 150b come into contact with the pair of the permanent magnets 200a and 200b, respectively. The pressing portions 150a and 150b include a first pressing portion 150a and a second pressing portion 150b, respectively. The first pressing portion 150a comes into contact with one end 201a of the first permanent magnet 200a. The second pressing portion 150b comes into contact with one end 201b of the second permanent magnet 200b. The first pressing portion 150a comes into contact with one end 201a of the first permanent magnet 200a, but does not come into contact with edges adjacent to one end 201a of the first permanent magnet 200a. The first pressing portion 150a fixes the first permanent magnet 200a without coming into contact with the edges adjacent to one end 201a of the first permanent magnet 200a. This eliminates the need to perform a chamfering process of rounding off edges of one end 201a of the first permanent magnet 200a. That is, one end 201a of the first permanent magnet 200a, which comes into contact with the first pressing portion 150a, can have right-angled edges. The second pressing portion 150b comes into contact with one end 201b of the second permanent magnet 200b, but does not come into contact with edges adjacent to one end 201b of the second permanent magnet 200b. The second pressing portion 150b fixes the second permanent magnet 200b without coming into contact with the edges adjacent to one end 201b of the second permanent magnet 200b. This eliminates the need to perform the chamfering process of rounding off the edges of one end 201b of the second permanent magnet 200b. That is, one end 201b of the second permanent magnet 200b, which comes into contact with the second pressing portion 150b, can have right-angled edges.

The pair of the permanent magnets 200a and 200b come into contact with the partition 170. In this case, the magnet accommodation portions 110a and 110b have rounded edges, instead of right-angled edges. Because of this, edges adjacent to the respective the other end 203a and 203b adjacent to the partition 170 of the first permanent magnet 200a and the second permanent magnet 200b are rounded off with the chamfering process. Thus, the respective the other end 203a and 203b adjacent to the partition 170 of the first permanent magnet 200a and the second permanent magnet 200b have rounded edges, instead of right-angled edges. In a case where, without performing the chamfering process, the pair of the permanent magnets 200a and 200b are inserted into the magnet accommodation portions 110a and 110b, respectively, the edges adjacent to the respective the other end 203a and 203b of the pair of the permanent magnets 200a and 200b do not fit with the corresponding rounded edges, respectively, of the magnet accommodation portions 110a and 110b. Thus, the pair of the permanent magnets 200a and 200b are damaged.

According to one form of the present disclosure, the pressing portions 150a and 150b, respectively, fix the pair of the permanent magnets 200a and 200b. This eliminates the need for the rotor core 100 to include respective fixation jaws for fixing the pair of the permanent magnets 200a and 200b. In addition, the pair of the permanent magnets 200a and 200b are fixed within the rotor core 100, without filling empty spaces with epoxy. These empty spaces are created after the pair of the permanent magnets 200a and 200b are inserted into the magnet accommodation portions 110a and 110b, respectively. In addition, the pressing portions 150a and 150b have their respective forms that are convex toward the pair of the permanent magnets 200a and 200b. This reduces the empty spaces between the first permanent magnets 200a and the first magnet accommodation portion 110a and between the second permanent magnets 200b and the second magnet accommodation portion 110b.

According to one form of the present disclosure, the pressing portions 150a fixes the permanent magnets 200a, without coming into contact with the edges adjacent to one end 201a of the permanent magnet 200a. Furthermore, the pressing portions 150b fix the permanent magnet 200b, without coming into contact with the edges adjacent to one end 201b of the permanent magnets 200b. This eliminates the need to perform the chamfering process of rounding off the edges of the permanent magnets 200a and 200b. Thus, the cost of performing the chamfering process can be reduced. However, the chamfering process may be performed on the edges adjacent to the partition 170, of the permanent magnets 200a and 200b.

According to another form of the present disclosure, the rotor core 100 does not include the respective fixation jaws for fixing the pair of the permanent magnets 200a and 200b. Furthermore, the rotor core 100 does not need to have respective large-sized magnet accommodation portions 110a and 110b in order to prevent damage to the pair of the permanent magnets 200a and 200b. Thus, magnetic flux leakage can be prevented from occurring due to the fixation jaws and the empty spaces within the rotor core 100. In addition, the chamfering process of rounding off the edges of the pair of the permanent magnets 200a and 200b is not performed. Thus, magnetic flux of the pair of the permanent magnets 200a and 200b increases by approximately 0.1 kg, thereby improving motor performance.

FIG. 3 is an enlarged view illustrating an area A in FIG. 2. For simplicity, a description of contents that are the same as those described with reference to FIG. 2 is not repeated.

With reference to FIGS. 2 and 3, the first pressing portion 150a includes a contact area 151a that comes into contact with the first permanent magnet 200a and a non-contact area 152a that does not come into contact with the first permanent magnet 200a. The first permanent magnet 200a has the form of a hexahedron. Therefore, the first permanent magnet 200a has four edges. Two non-contact areas 152a do not come into contact with the first permanent magnet 200a. That is, the first pressing portion 150a includes the contact area 151a and the non-contact areas 152a. The contact area 151a comes into contact with a middle portion of one end 201a of the first permanent magnet 200a. The non-contact areas 152a extend curvedly in opposite directions, from both end, respectively, of the middle portion thereof and do not come into contact with one end 201a of the first permanent magnet 200a. The non-contact areas 152a mean areas that are closer to the edges of the first permanent magnet 200a than the contact area 151a.

The first pressing portion 150a has a form that results from recessing an inside face of the first internal hole 130a toward the first permanent magnet 200a. Accordingly, only a portion of the first pressing portion 150a comes into contact with the first permanent magnet 200a. However, the first pressing portion 150a has a form that is convex due to an external force. Thus, with only the first pressing portion 150a, the first permanent magnet 200a is fixed within the rotor core 100.

In addition, the form of the first pressing portion 150a prevents the first pressing portion 150a from coming into contact with the edges adjacent to one end 201a of the first permanent magnet 200a. This eliminates the need to round off the edges of one end 201a of the first permanent magnet 200a by performing a separate process. Generally, the edges of one end 201a of the first permanent magnet 200a do not fit with corresponding edges, respectively, of the magnet accommodation portion 110a. Thus, the first permanent magnet 200a is damaged. However, according to the forms of the present disclosure, the non-contact area 152a of the first pressing portion 150a eliminates the need to round off the edges of one end 201a of the first permanent magnet 200a, thereby preventing the damage to the first permanent magnet 200a.

An empty space is present between the non-contact area 152a and one end 201a of the first permanent magnet 200a. However, there is no need to perform a process of filling the empty space with epoxy. This is because, with only the first pressing portion 150a, the first permanent magnet 200a is fixed within the rotor core 100.

Figure 4:
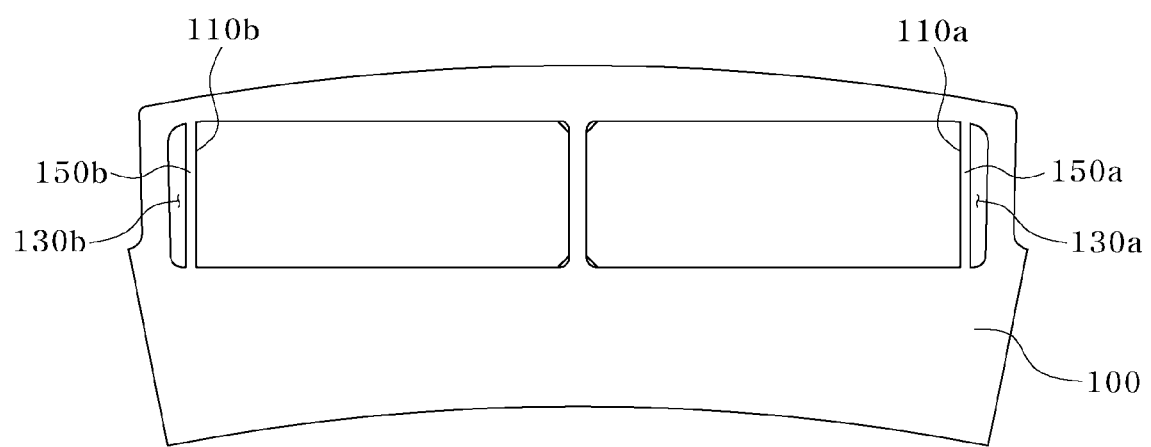
FIGS. 4 to 6 are views each illustrating a method of fixing a permanent magnet in a rotor core according to one form of the present disclosure.
Figure 5:
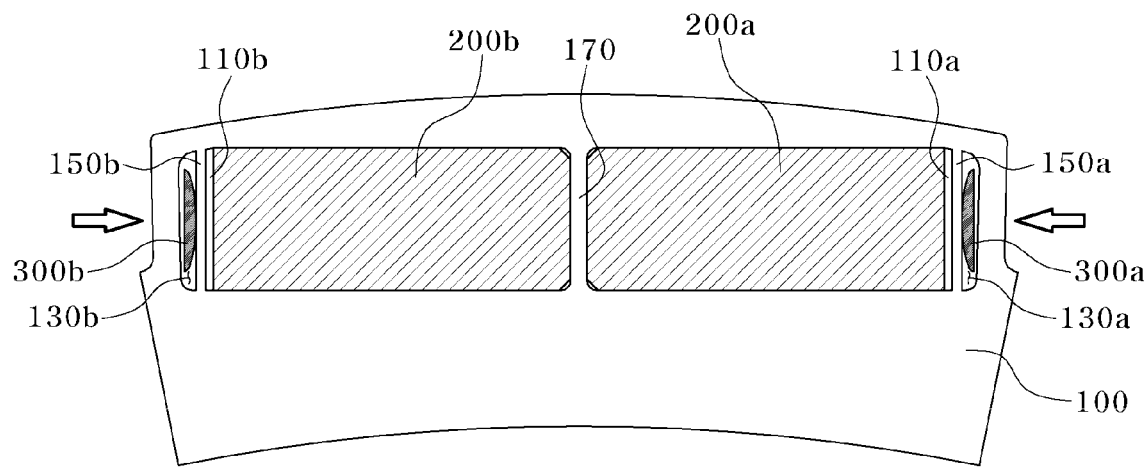
Figure 6:
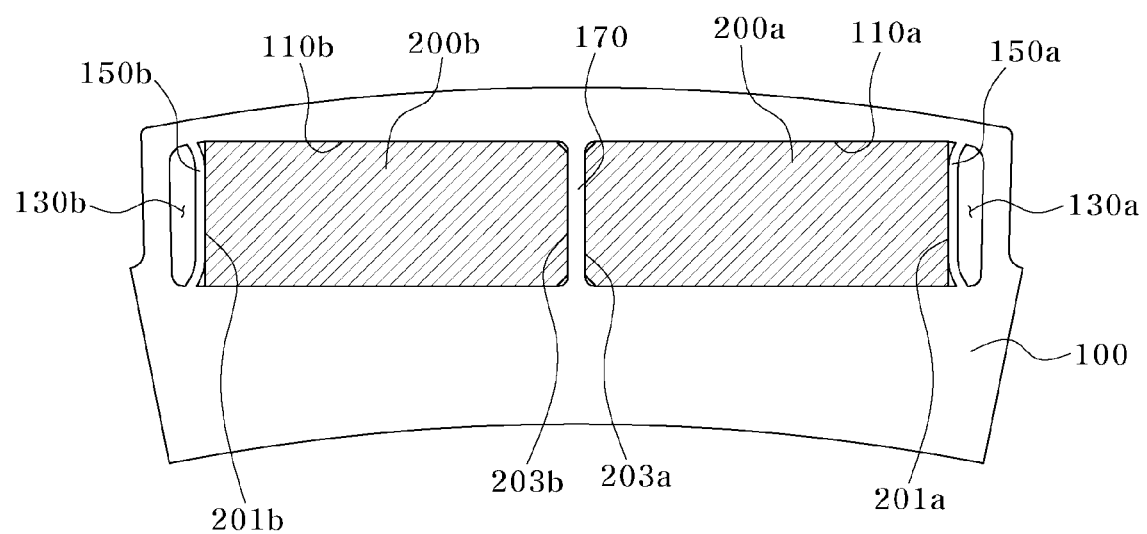

FIGS. 4 to 6 are views each illustrating a method of fixing a permanent magnet in a rotor core according to some forms of the present disclosure.

With reference FIG. 4, the magnet accommodation portions 110a and 110b and the internal holes 130a and 130b are formed by performing a punching process on the rotor core 100. The formation of the magnet accommodation portions 110a and the internal holes 130a forms the pressing portion 150a between the magnet accommodation portions 110a and the internal holes 130a. The formation of the magnet accommodation portions 110b and the internal holes 130b forms the pressing portion 150b between the magnet accommodation portions 110b and the internal holes 130b. In this case, the pressing portions 150a and 150b have the form of a flat plate.

With reference to FIG. 5, the permanent magnets 200a and 200b in a pair are inserted into the magnet accommodation portions 110a and 110b, respectively.

Subsequently, bars 300a and 300b for performing a caulking process are inserted into the internal holes 130a and 130b, respectively. In this case, the bars 300a and 300b may have their respective semi-elliptical cross sections. The bars 300a and 300b may have their respective forms that are convex toward pressing portions 150a and 150b.

With reference to FIG. 6, the caulking process of pressing the bars 300a and 300b, respectively, toward the pair of the permanent magnets 200a and 200b is performed. With the caulking process, the pressing portions 150a and 150b are changed in form. Specifically, the pressing portions 150a and 150b that, respectively, are pressed, with the caulking process, toward the pair of the permanent magnets 200a and 200b are changed to forms that, respectively, are convex toward the pair of the permanent magnets 200a and 200b. Accordingly, respective portions of the pressing portions 150a and 150b, respectively, come into contact with one end 201a and 201b, and thus, respectively, fix the permanent magnets 200a and 200b within the rotor core 100.

According to one form of the present disclosure, the pair of the permanent magnets 200a and 200b are fixed, without the edges adjacent to one end 201a of the first permanent magnet 200a and the edges adjacent to one end 201b of the second permanent magnet 200b coming into contact with the pressing portions 150a and 150b, respectively. Thus, a process of forming the fixation jaw or an epoxy molding process can be omitted.

Figure 7:
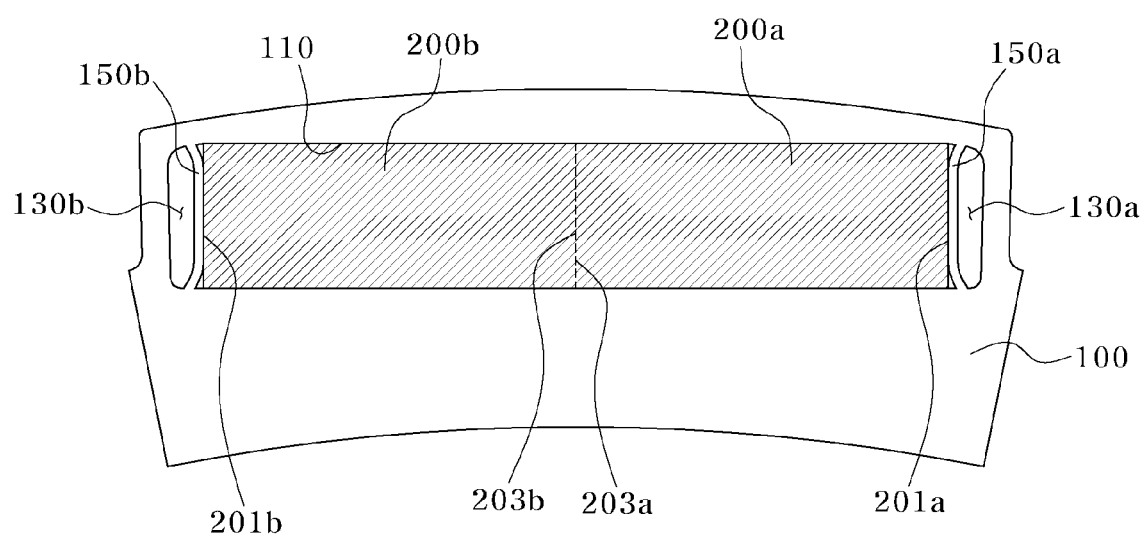
FIG. 7 is a view illustrating a rotor core that employs a structure for fixing a permanent magnet in a rotor core according to another form of the present disclosure.

FIG. 7 is a view illustrating a rotor core that employs a structure for fixing a permanent magnet in a rotor core according to another form of the present disclosure. For simplicity, a description of contents that are the same as those described with reference to FIG. 2 is not repeated.

With reference to FIG. 7, one magnet accommodation portion 110 into which a pair of the permanent magnets 200a and 200b is inserted is formed in the rotor core 100. The pair of the permanent magnets 200a and 200b is inserted into the magnet accommodation portions 110 with their respective the other end 203a and 203b coming into contact with each other.

At this time, the edges adjacent to the respective the other end 203a and 203b of the pair of the permanent magnets 200a and 200b do not come into contact with edges, respectively, of the magnet accommodation portions 110. Therefore, the chamfering process of rounding off the edges adjacent to the respective the other end 203a and 203b of the permanent magnets 200a and 200b can be omitted.

In addition, as described in FIG. 2, the structure in which the pressing portions 150a and 150b, respectively, fix the permanent magnets 200a and 200b also makes it unnecessary to perform the chamfering process of rounding off the edges adjacent to the respective one end 201a and 201b of the permanent magnets 200a and 200b.

According to one form of the present disclosure, the pressing portions 150a and 150b make it possible for the respective one end 201a and 201b of the pair of the permanent magnets 200a and 200b to have right-angled edges. In addition, since the other ends 203a and 203b of the permanent magnets 200a and 200b are respectively inserted into the magnet accommodation portions 110 in a state of coming into contact with each other, the other ends 203a and 203b of the permanent magnets 200a and 200b respectively have right-angled edges. That is, faces of the pair of the permanent magnets 200a and 200b can have four right-angled edges. Therefore, the chamfering process for inserting the pair of the permanent magnets 200a and 200b into the magnet accommodation portions 110 and fixing them without any damage is not performed. This provides the advantages that a manufacturing process is simplified and that a manufacturing cost is thus reduced.

The forms of the present disclosure are described above with reference to the accompanying drawings, and it will be apparent to a person of ordinary skill in the art to which the present disclosure pertains that other forms of the present disclosure can also be implemented without any modification to the technical idea and the essential feature thereof. Therefore, it should be understood that, in every aspect, the forms described above are exemplary and are not restricted.

What is claimed is:

1. A structure for fixing a permanent magnet in a rotor core, the structure comprising:
   at least one magnet accommodation portion into which at least one permanent magnet is to be inserted;
   an internal hole formed in an area adjacent to one end of the at least one magnet accommodation portion; and
   a pressing portion provided between the at least one magnet accommodation portion and the internal hole, the pressing portion configured to form a convex shape toward the at least one permanent magnet and be in contact with the at least one permanent magnet,
   wherein the internal hole is formed to penetrate the rotor core.

2. The structure according to claim 1, wherein one end of the at least one permanent magnet that comes into contact with the pressing portion has right-angled edges.

3. The structure according to claim 1, wherein the pressing portion comprises: a contact portion that comes into contact with one end of the at least one permanent magnet, and a non-contact portion that does not come into contact with the one end of the at least one permanent magnet, and
the non-contact portion is an area that is closer to edges of the at least one permanent magnet than the contact portion.

4. The structure according to claim 1, wherein the at least one permanent magnet comprises a pair of permanent magnets that is inserted into the at least one magnet accommodation portion.

5. The structure according to claim 4, wherein a first one end of the pair of the permanent magnets and a second end of the pair of the permanent magnets have right-angled edges, wherein the one end of the pair of the permanent magnets come into contact with the pressing portions, and the other end of the pair of the permanent magnets come into contact with each other.

6. The structure according to claim 1, wherein epoxy resin is not provided between one end of the at least one permanent magnet and the pressing portion.

7. The structure according to claim 1, wherein the at least one magnet accommodation portion comprises two magnet accommodation portions provided in the rotor core,
a partition formed in a portion of the rotor core is disposed between the two magnet accommodation portions, and
the at least one permanent magnet includes a pair of permanent magnets, and the pair of permanent magnets are inserted in the two magnet accommodation portions, respectively.

8. The structure according to claim 7, wherein a first end of respective permanent magnets of the pair of the permanent magnets has rounded edges, and configured to come into contact the partition, and
a second end of the respective permanent magnets has right-angled edges, and configured to come into contact with the pressing portion.

* * * * *